United States Patent
Liu et al.

(10) Patent No.: US 7,340,818 B2
(45) Date of Patent: Mar. 11, 2008

(54) METHOD OF IMPROVING THE CONTACT BETWEEN BIPOLAR PLATES AND MEMBRANE ELECTRODE ASSEMBLY OF A FLAT PANEL FUEL CELL

(75) Inventors: Yung-Yi Liu, Taipei Hsien (TW); James Shang, Taoyuan (TW)

(73) Assignee: Nan Ya Printed Circuit Board Corporation, Luchu, Taoyuan (TW)

( * ) Notice: Subject to any disclaimer, the term of this patent is extended or adjusted under 35 U.S.C. 154(b) by 270 days.

(21) Appl. No.: 10/908,830

(22) Filed: May 27, 2005

(65) Prior Publication Data
US 2006/0042751 A1 Mar. 2, 2006

(30) Foreign Application Priority Data
Sep. 1, 2004 (TW) .............................. 93126387 A

(51) Int. Cl.
*H01S 4/00* (2006.01)
*H01R 43/00* (2006.01)
*H01M 2/00* (2006.01)

(52) U.S. Cl. .................. 29/592.1; 29/623.1; 29/825; 429/34

(58) Field of Classification Search ............. 29/592.1, 29/623.1, 825; 429/34
See application file for complete search history.

(56) References Cited

U.S. PATENT DOCUMENTS

| | | | | |
|---|---|---|---|---|
| 4,666,579 A | * | 5/1987 | Beaver et al. | 204/253 |
| 4,824,741 A | * | 4/1989 | Kunz | 429/26 |
| 5,759,712 A | * | 6/1998 | Hockaday | 429/30 |
| 6,261,710 B1 | * | 7/2001 | Marianowski | 429/34 |
| 6,833,212 B2 | * | 12/2004 | Jeon et al. | 429/30 |
| 7,147,956 B2 | * | 12/2006 | Ohtani et al. | 429/39 |
| 7,232,582 B2 | * | 6/2007 | Kikuchi et al. | 426/38 |

FOREIGN PATENT DOCUMENTS

CN 1121075 C 9/2003

* cited by examiner

*Primary Examiner*—C. J Arbes
(74) *Attorney, Agent, or Firm*—Winston Hsu

(57) ABSTRACT

A flat panel DMFC (direct methanol fuel cell) includes a first electrode plate, a set of membrane assemblies, at least a bonding sheet, a second electrode, and fuel container base. Because of the gap between the first/second electrode plates and the membrane assembly when they are laminated, the present invention provides a method to improve the contact between the first/second electrode plates and the membrane assembly.

6 Claims, 6 Drawing Sheets

METHOD OF IMPROVING THE CONTACT BETWEEN BIPOLAR PLATES AND MEMBRANE ELECTRODE ASSEMBLY OF A FLAT PANEL FUEL CELL

BACKGROUND OF INVENTION

1. Field of the Invention

The present invention relates to a flat panel fuel cell, and more particularly, to a method of improving the contact between bipolar plates and membrane electrode assembly of a flat panel fuel cell.

2. Description of the Prior Art

A fuel cell is an electrochemical cell in which a free energy change resulting from a fuel oxidation reaction is converted into electrical energy. Fuel cells utilizing methanol as fuel are typically called Direct Methanol Fuel Cells (DMFCs), which generate electricity by combining gaseous or aqueous methanol with air. DMFC technology has become widely accepted as a viable fuel cell technology that offers itself to many application fields such as electronic apparatuses, vehicles, military equipment, the aerospace industry, and so on.

DMFCs, like ordinary batteries, provide DC electricity from two electrochemical reactions. These reactions occur at electrodes (or poles) to which reactants are continuously fed. The negative electrode (anode) is maintained by supplying methanol, whereas the positive electrode (cathode) is maintained by the supply of air. When providing current, methanol is electrochemically oxidized at the anode electrocatalyst to produce electrons, which travel through the external circuit to the cathode electrocatalyst where they are consumed together with oxygen in a reduction reaction. The circuit is maintained within the cell by the conduction of protons in the electrolyte. One molecule of methanol ($CH_3OH$) and one molecule of water ($H_2O$) together store six atoms of hydrogen. When fed as a mixture into a DMFC, they react to generate one molecule of $CO_2$, 6 protons ($H+$), and 6 electrons to generate a flow of electric current. The protons and electrons generated by methanol and water react with oxygen to generate water.

In terms of the amount of electricity generated, a DMFC can generate 300-500 milliwatts per centimeter squared. In general, conventional DMFCs are comprised of numerous basic cells and each cell only carries a limited amount of working voltage. Consequently, the cells need to be stacked together in order to achieve a required level of operational voltage.

SUMMARY OF INVENTION

It is therefore an objective of the present invention to provide a method of improving the contact between bipolar plates and the membrane electrode assembly of a flat panel fuel cell for solving the above-mentioned problems.

According to the preferred embodiment of the present invention, a method of improving the contact between bipolar plates and membrane electrode assembly of a flat panel fuel cell comprises the following steps: providing a first bipolar plate, a membrane electrode assembly, a second bipolar plate, and at least one bonding sheet; the MEA being disposed on the first bipolar plate, an opening being included in the bonding sheet for containing the MEA, and the second bipolar plate being disposed on the MEA; the first bipolar plate including a first MEA surface contacting the MEA and a fuel surface contacting the fuel, and the second bipolar plate including a second MEA surface contacting the MEA and an air surface contacting the air; a first metal layer being disposed on the metal surface, a second metal layer being disposed on the first MEA surface, a third metal layer being disposed on the second MEA surface, and a fourth metal layer being disposed on the air surface; the thickness of the second metal layer being greater than the thickness of the first metal layer and the thickness of the third metal layer being greater than the thickness of the fourth metal layer; and laminating the first bipolar plate, the MEA, the second bipolar plate, and the bonding sheet together for forming a bipolar/MEA assembly.

According to the second embodiment of the present invention, a method for improving the contact between bipolar plates and membrane electrode assembly (MEA) of a flat panel fuel cell comprises the following steps: providing a bipolar plate and a membrane electrode assembly (MEA), in which the bipolar plate includes at least one electrode region and the MEA is disposed on the electrode region of the bipolar plate; providing a plurality of conductive bumps on the electrode region; and contacting the membrane electrode assembly with the plurality of conductive bumps.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
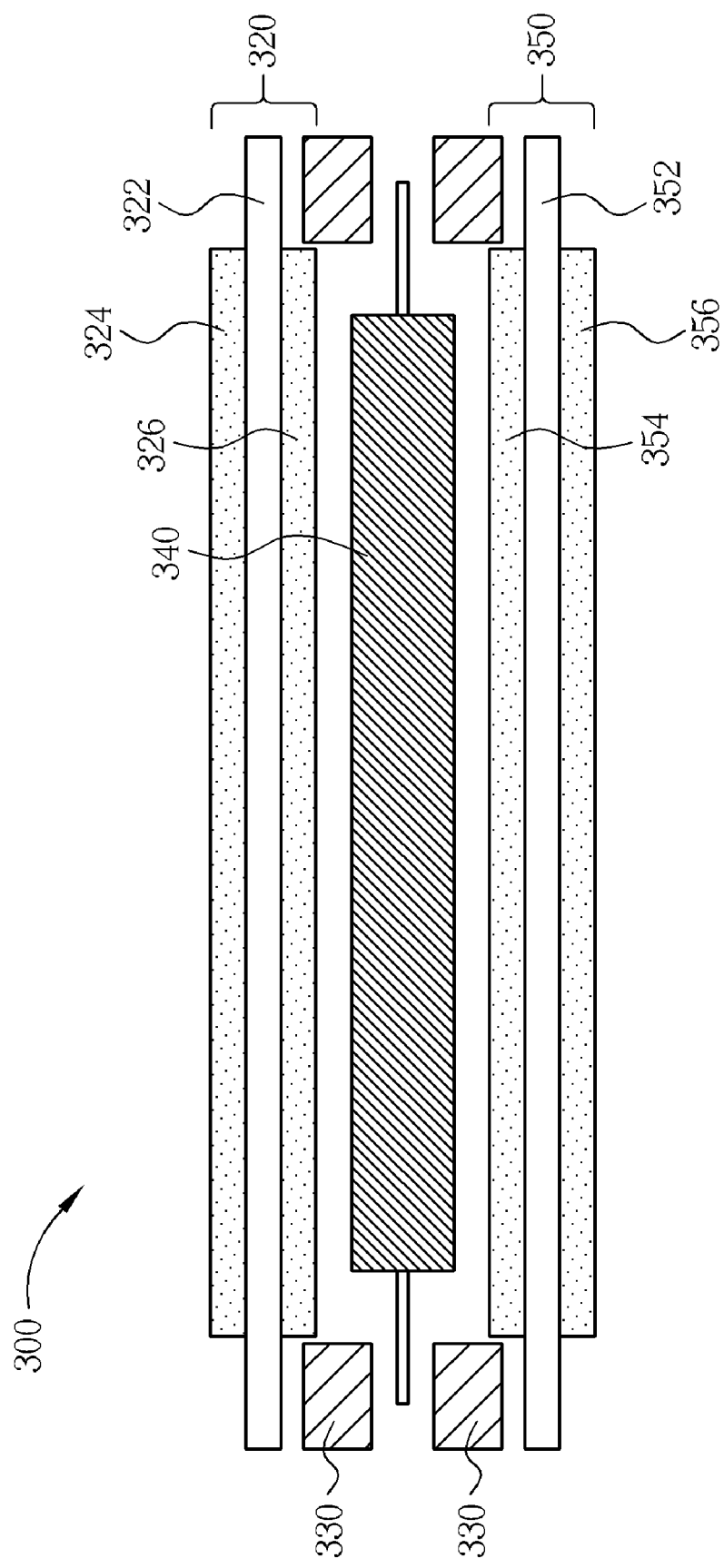
FIG. 1 is a perspective diagram showing a conventional bipolar/MEA assembly of a flat panel fuel cell.
Figure 2:
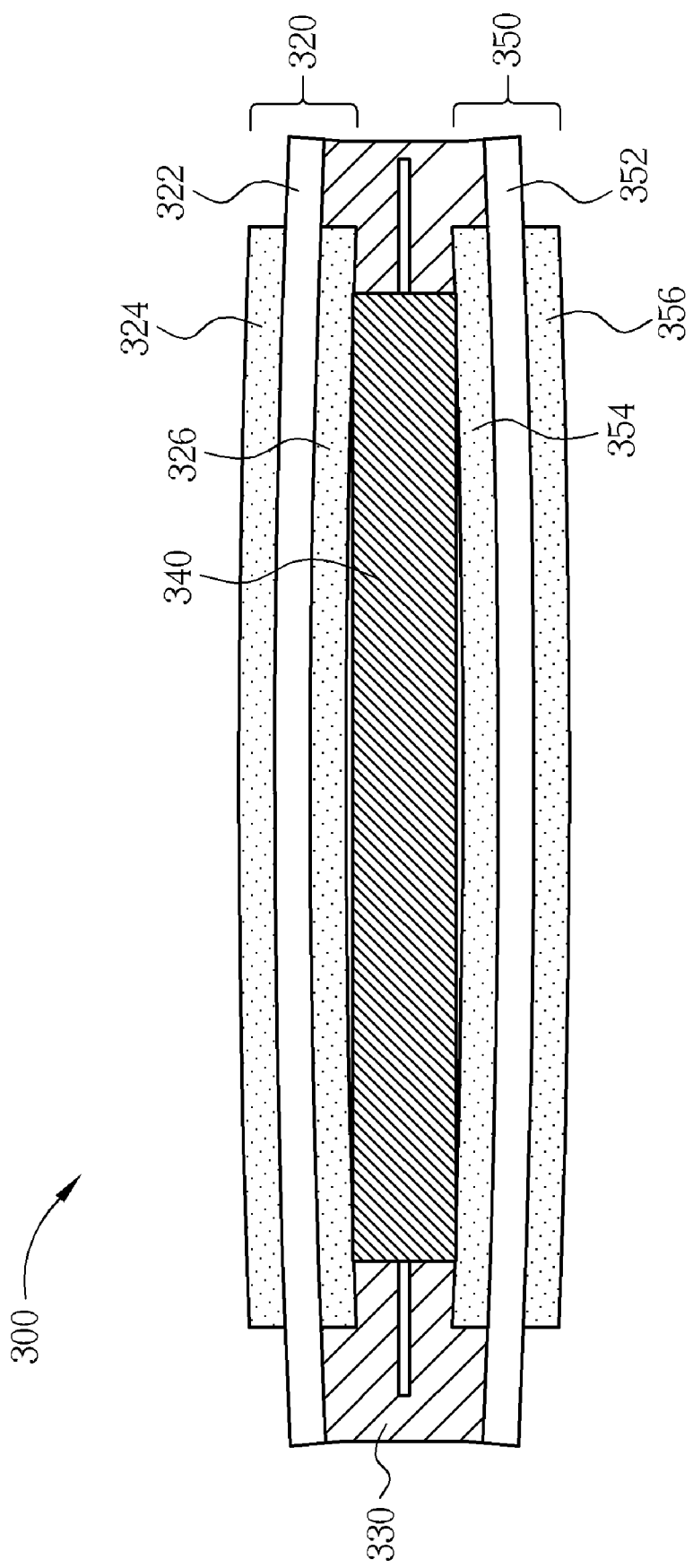
FIG. 2 is a perspective diagram showing a conventional bipolar/MEA assembly of a flat panel fuel cell after lamination.

Please refer to FIG. 1 and FIG. 2. FIG. 1 and FIG. 2 are perspective diagrams showing the bipolar/MEA assembly of a flat panel fuel cell before and after lamination. As shown in FIG. 1, the bipolar/MEA assembly 300 includes a first bipolar plate 320, at least one bonding sheet 330, a membrane electrode assembly (MEA) 340, and a second bipolar plate 350. The first bipolar plate 320 includes a first substrate 322, a first metal layer 324 disposed on the upper surface of the first substrate 322, and a second metal layer 326 disposed on the lower surface of the first substrate 322. The second bipolar plate 350 includes a second substrate 352, a third metal layer 354 disposed on the upper surface of second substrate 352, and a fourth metal layer 356 disposed on the lower surface of the second substrate 352. The metal layers described previously are equal in thickness and the first metal layer 324, the second metal layer 326, the third metal layer 354, and the fourth metal layer 356 can be comprised of copper metals.

As shown in FIG. 2, a laminating process is then performed to contact the second metal layer 326 and the third metal layer 354 to the MEA 340. However, the stress induced by metal layers will often cause problems such as extra spacing and poor adhesion between the second metal layer 326, the third metal layer 354, and the MEA 340. In addition, a change in amount of pressure exerted on the MEA 340 may also cause the MEA 340 to produce an uneven thickness and corrugated surface, and a change in temperature may cause a separation to the bipolar plates as a result of expansion or shrinkage. Consequently, various effects caused after the lamination will bring an increase in cost and decrease in manufacture efficiency for the bipolar/MEA assembly 300.

Figure 3:
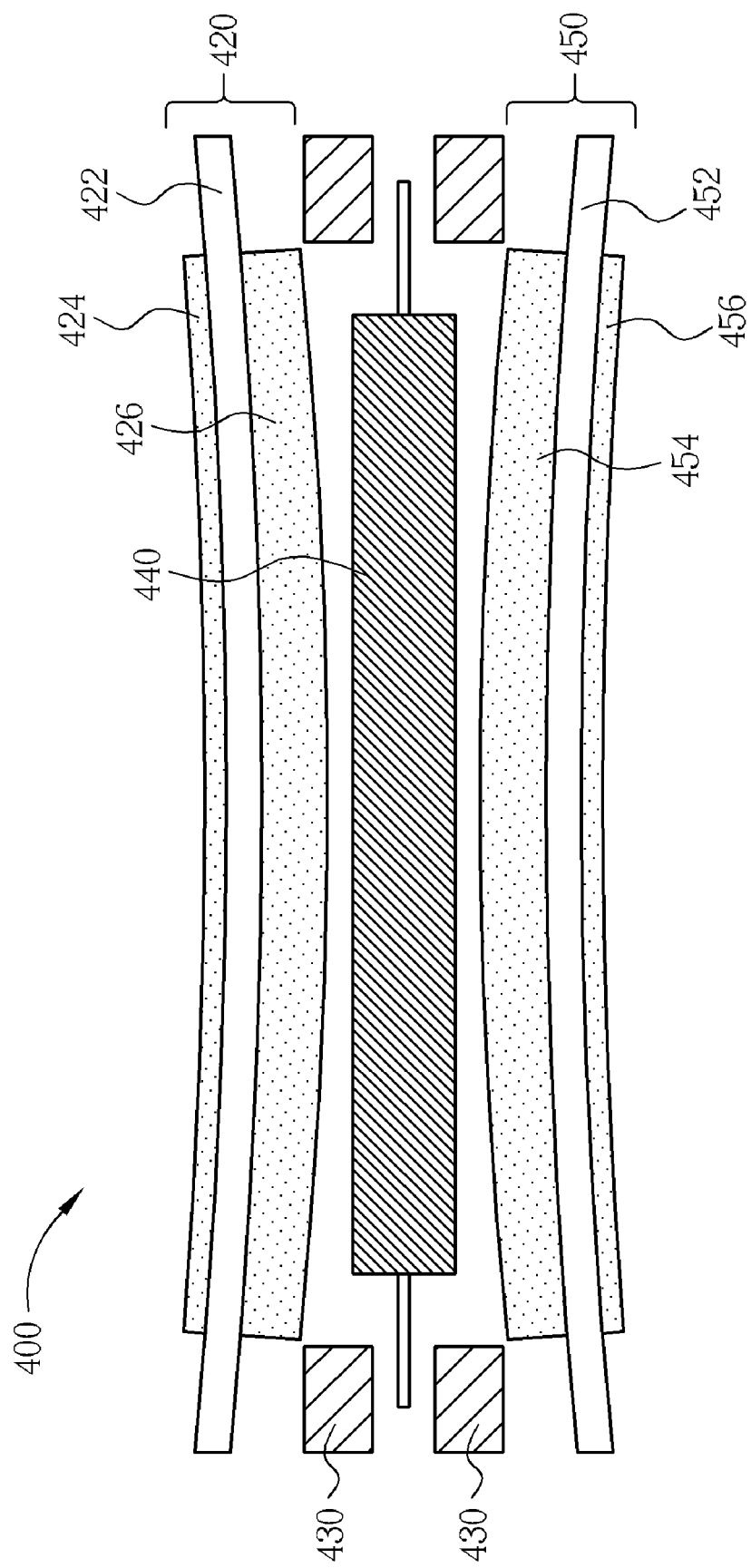
FIG. 3 is a perspective diagram showing the bipolar/MEA assembly of a flat panel fuel cell according to the preferred embodiment of the present invention.
Figure 4:
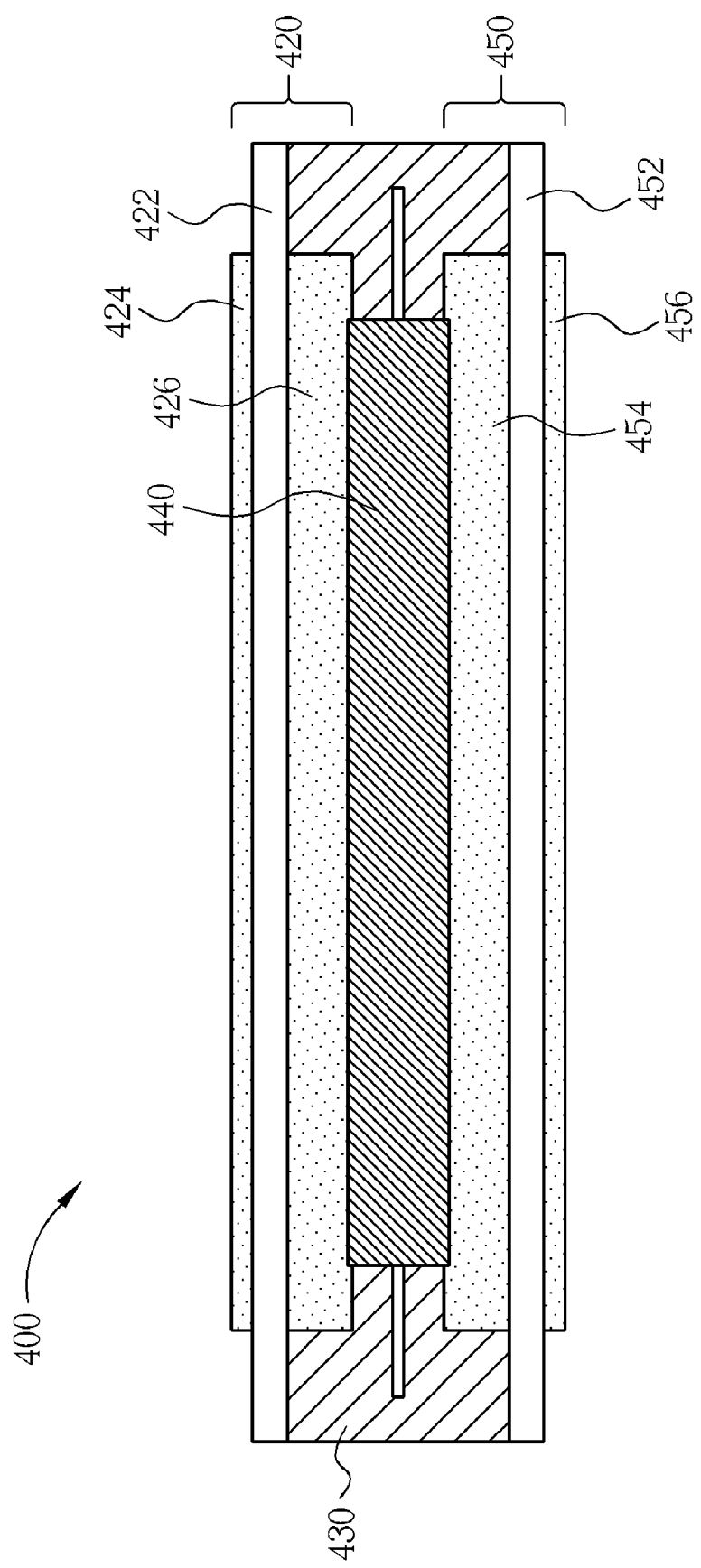
FIG. 4 is a perspective diagram showing the bipolar/MEA assembly of a flat panel fuel cell after lamination according to the preferred embodiment of the present invention.

Please refer to FIG. 3 and FIG. 4. FIG. 3 and FIG. 4 are perspective diagrams showing a method for improving the contact between the bipolar plates and the MEA of a flat panel fuel cell according to the preferred embodiment of the present invention. As shown in FIG. 3, the bipolar/MEA assembly 400 includes a first bipolar plate 420, at least one bonding sheet 430, a membrane electrode assembly (MEA) 440, and a second bipolar plate 450. The first bipolar plate 420 includes a first substrate 422, a first metal layer 424 disposed on the upper surface of the first substrate 422, and a second metal layer 426 disposed on the lower surface of the first substrate 422. The second bipolar plate 450 includes a second substrate 452, a third metal layer 454 disposed on the upper surface of second substrate 452, and a fourth metal layer 456 disposed on the lower surface of the second substrate 452. The first metal layer 424, the second metal layer 426, the third metal layer 454, and the fourth metal layer 456 can be comprised of copper metals. The thickness of the second metal layer 426 is greater than the thickness of the first metal layer 424 and the thickness of the third metal layer 454 is greater than the thickness of the fourth metal layer 456. In addition, the first substrate 422 and the second substrate 452 can be comprised of glass fiber reinforced polymeric materials, such as FR-1, FR-2, FR-3, FR-4, FR-5, CEM-1, or CEM-3 ANSI grade. The MEA can be Nafion membrane electrode assembly from DuPont Corp., or any other solid state membrane electrode assembly with similar functions, whereas the bonding sheet can be made of prepreg B-stage resin commonly utilized in printed circuit board (PCB) fabrication.

As shown in FIG. 4, a laminating process is performed next to bind the first bipolar plate 420, the MEA 440, the second bipolar plate 450, and the bonding sheet 430 together for forming a bipolar/MEA assembly 400.

Figure 5:
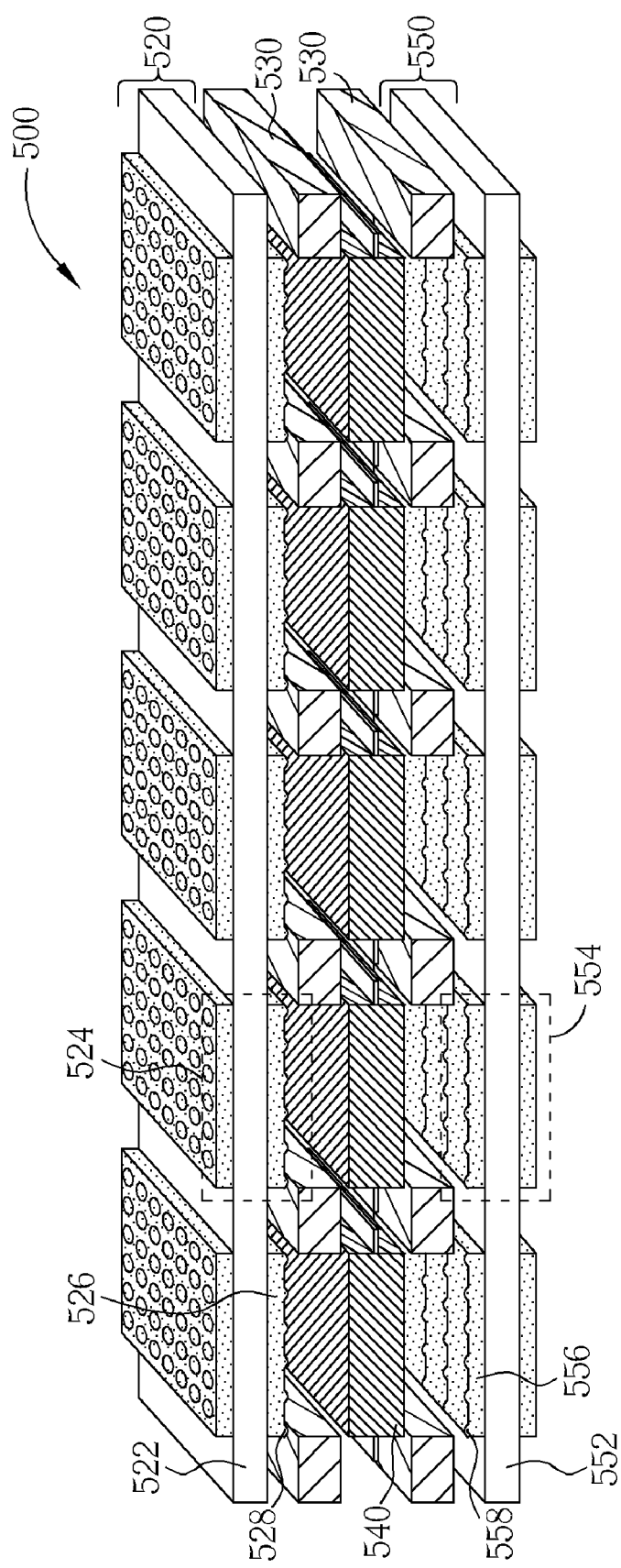
FIG. 5 is a perspective diagram showing the bipolar/MEA assembly of a flat panel fuel cell according to the second embodiment of the present invention.
Figure 6:
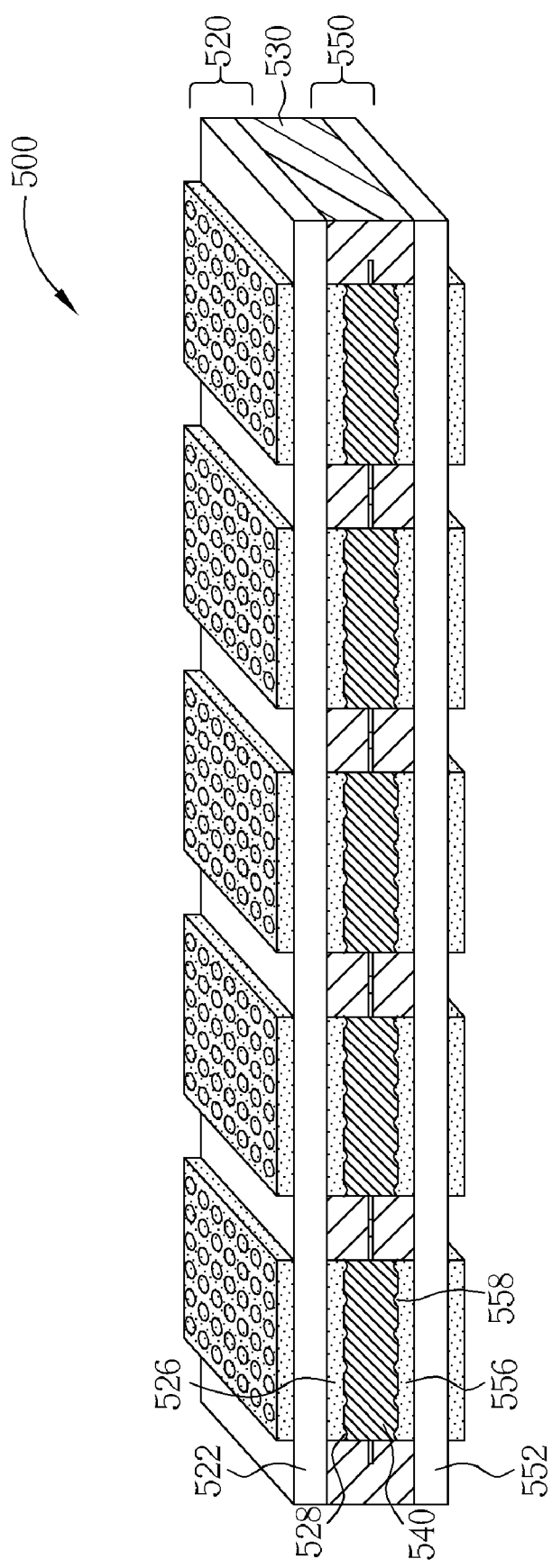
FIG. 6 is a perspective diagram showing the bipolar/MEA assembly of a flat panel fuel cell after lamination according to the second embodiment of the present invention.

Please refer to FIG. 5 and FIG. 6. FIG. 5 and FIG. 6 are perspective diagrams showing another embodiment for improving the contact between the bipolar plates and the MEA of a flat panel fuel cell according to the present invention. As shown in FIG. 5, the bipolar/MEA assembly 500 includes a first bipolar plate 520, at least one bonding sheet 530, a membrane electrode assembly (MEA) 540, and a second bipolar plate 550. The first bipolar plate 520 includes a first substrate 522 and at least one electrode region 524, in which a plurality of conductive bumps 528 is disposed on the lower surface 526 of the electrode region 524. The second bipolar plate 550 includes a second substrate 552 and at least one electrode region 554, in which a plurality of conductive bumps 558 is disposed on the upper surface 556 of the electrode region 554. The conductive bumps 528, 558 can be comprised of tin, lead, tin-lead alloy, or copper, the outmost layer of the conductive bumps 528, 558 may include an Au-plating layer disposed thereon, and the thickness of the conductive bumps 528, 558 can be greater than 0.1 mm.

In addition, the first substrate 522 and the second substrate 552 can be comprised of glass fiber reinforced polymeric materials, such as FR-1, FR-2, FR-3, FR-4, FR-5, CEM-1, or CEM-3 ANSI grade and the MEA can be Nafion membrane electrode assembly from DuPont Corp., or any other solid state membrane electrode assembly with similar functions, whereas the bonding sheet can be made of prepreg B-stage resin commonly utilized in PCB fabrication.

As shown in FIG. 6, a laminating process is then performed to bind the first bipolar plate 520, the MEA 540, the second bipolar plate 550, and the bonding sheet 530 together for forming a bipolar/MEA assembly 500.

In contrast to the conventional method, the disclosed method for improving the contact between bipolar plates and membrane electrode assembly of a flat panel fuel cell provides numerous advantages. By utilizing upper and lower metal layers having different thickness and the conductive bumps on the surface of the electrode region of the MEA, the present invention is able to effectively reduce the contact inability problem between the bipolar plates and the MEA, which is caused by the uneven thickness and decrease in thickness of the MEA after lamination. Moreover, an increase in electric power can also be achieved by applying an appropriate amount of pressure to the MEA.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving the contact between bipolar plates and membrane electrode assembly (MEA) of a flat panel fuel cell, comprising:
   providing a bipolar plate and a membrane electrode assembly (MEA), in which the bipolar plate includes at least one electrode region integrated with a non-metal substrate of the bipolar plate in unitary manner, and wherein the MEA is disposed on the electrode region of the bipolar plate;
   providing a plurality of conductive bumps directly on the electrode region; and
   directly contacting the membrane electrode assembly with the plurality of conductive bumps.

2. The method of claim 1 wherein the thickness of the plurality of conductive bumps is greater than 0.1 mm.

3. The method of claim 1 wherein conductive bumps are comprised of tin, lead, and tin-lead alloy.

4. The method of claim 1 wherein the membrane electrode assembly is a solid state membrane electrode assembly.

5. The method of claim 1 wherein the non-metal substrate is comprised of glass fiber reinforced polymeric materials.

6. The method of claim 1 wherein the non-metal substrate is comprised of glass fiber reinforced polymeric materials derived from ANSI-grade FR-1, FR-2, FR-3, FR-4, FR-5, CEM-1, or CEM-3.

* * * * *